United States Patent [19]

Munson

[11] Patent Number: 5,519,436
[45] Date of Patent: May 21, 1996

[54] STATIC IMAGE BACKGROUND REFERENCE FOR VIDEO TELECONFERENCING APPLICATIONS

[75] Inventor: Bill A. Munson, Portland, Oreg.

[73] Assignee: Intel Corporation, Santa Clara, Calif.

[21] Appl. No.: 262,951

[22] Filed: Jun. 21, 1994

[51] Int. Cl.[6] .................................................. H04N 7/26
[52] U.S. Cl. ........................... 348/19; 348/15; 348/397
[58] Field of Search ................................ 348/17–19, 15, 348/397, 409, 415; H04N 7/26

[56] References Cited

U.S. PATENT DOCUMENTS

| | | |
|---|---|---|
| 4,524,421 | 6/1985 | Searby et al. . |
| 4,602,286 | 7/1986 | Kellar et al. . |
| 5,216,755 | 6/1993 | Walker et al. . |
| 5,258,836 | 11/1993 | Murata .......................... 348/19 X |
| 5,353,063 | 10/1994 | Yagisawa et al. ............... 348/716 X |

FOREIGN PATENT DOCUMENTS 8181237  5/1986  European Pat. Off. ................. 348/19

Primary Examiner—Victor R. Kostak
Attorney, Agent, or Firm—Blakely, Sokoloff, Taylor & Zafman

[57] ABSTRACT

An apparatus and method for partitioning video images into a first and second portion for more efficient compression/decompression and transfer across a network is disclosed. The present invention includes a video controller that stores a reference image with a plurality of reference pixels, receives a foreground image, compares the reference image with the foreground image thereby identifying matched pixels, and replaces the matched pixels in the foreground image with null pixels. The video controller also compresses the foreground image, and transfers the foreground image including null pixel values over a network.

13 Claims, 6 Drawing Sheets

STATIC IMAGE BACKGROUND REFERENCE FOR VIDEO TELECONFERENCING APPLICATIONS

BACKGROUND OF THE INVENTION

1. Field of the Invention

The present invention relates to the field of video image processing and display systems.

2. Description of Related Art

Video processing systems provide means for decomposing a video image into component portions. This decomposition process is particularly important for the transmission of a video image across a data network, such as a video teleconferencing network. In any given video image, some component portions of the image are more dynamic than others. For example, in a typical desktop video teleconferencing application, a moving or rapidly changing foreground image is often shown on an unchanging or static background image portion. It is advantageous to identify and individually process dynamically changing image portions independently from static portions of the image. This is particularly advantageous for updating a video image across a data network.

Prior art implementations employ a technique called chroma-keying. Chroma-keying involves identifying an image component based on a particular pre-defined chroma value. Pixels containing this chroma value are either replaced with an alternate static image portion or used to suppress the transfer of corresponding pixel data across a data network. These systems are limited by the pre-defined fixed chroma-key value.

In other network based video teleconferencing applications, the video source, such as a camera that supplies the image is typically of a higher resolution than the display device on which the image is displayed or the data network over which the image is transferred. In these applications, images are typically reduced in size prior to a process of image compression and thereafter enlarged after a process of decompression. The resulting image looses picture information and the processing of the image consumes substantial processor resources.

Thus, a better system for processing images is required.

SUMMARY OF THE INVENTION

The present invention is an apparatus and method for partitioning video images into a first and second portion for more efficient compression/decompression and transfer across a network. The present invention includes a video controller comprising: 1) means for storing a reference image, the reference image includes a plurality of reference pixels, 2) means for receiving a foreground image, 3) means for comparing the reference image with the foreground image thereby identifying matched pixels, and 4) means for replacing the matched pixels in the foreground image with null pixels. The video controller of the present invention further includes: 1) means for compressing the foreground image, and 2) means for transferring the foreground image including null pixel values over a network.

It is therefore an object of the present invention that the compression/decompression of a video image is more efficient. It is a further advantage of the present invention that the transfer of video images across a network is more efficient.

These and other advantages of the present invention will become apparent as illustrated in the figures and described in the following detailed description of the preferred embodiment.

DETAILED DESCRIPTION OF THE PREFERRED EMBODIMENT

The present invention is an apparatus and method for partitioning video images into a first and second portion for more efficient compression/decompression and transfer across a network. In the following detailed description, numerous specific details are set forth in order to provide a thorough understanding of the present invention. However, it will be apparent to one of ordinary skill in the art that these specific details need not be used to practice the present invention. It other circumstances, well known structures, materials, circuits, and interfaces have not been shown or described in detail in order not to unnecessarily obscure the present invention.

Figure 1:
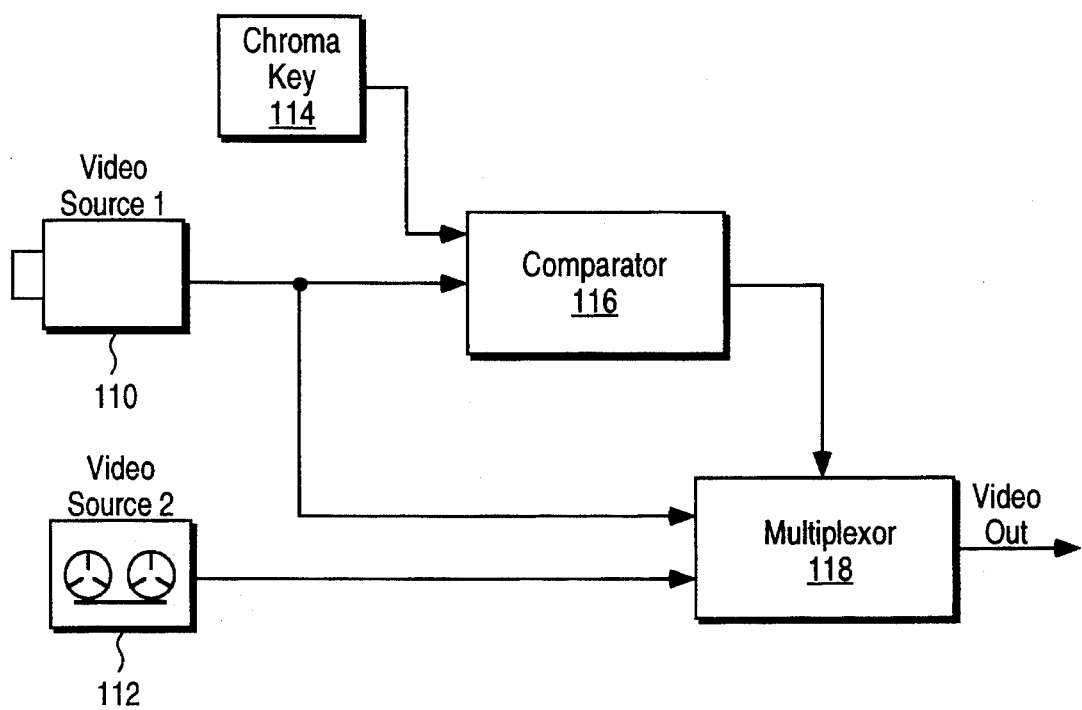
FIG. 1 illustrates the prior art system for using a chroma-key.

Referring to FIG. 1, a prior art technique of chroma-keying is illustrated. As illustrated in FIG. 1, a video source 110 such as a video camera provides a first source of video images comprising a stream of video frames. A second video source 112 provides an alternate source of video data comprising a different stream of video frames. It will be apparent to one of ordinary skill in the art that the first video source 110 may be a video device other than a video camera, and the second video source 112 may be other than a video tape recorder. The output of the first video source 110 is coupled to comparator 116 and a first input of multiplexor 118. The output of the second video source 112 is coupled to a second input of multiplexor 118. A chroma-key register 114 is coupled to a second input of comparator 116. Chroma-key register 114 is preloaded with a particular color or chromanance value that corresponds to a predefined video source switching value or key that is used to switch the input source for a given video frame on a picture element (pixel) by picture element basis. For example, the first video source 110 produces a stream of pixel values for each video frame of a video stream. Each of these pixel values are input to comparator 116. Each pixel value is compared with the content of chroma-key register 114. If the input pixel matches the chromanance key in chroma-key register 114, the output of comparator 116 switches multiplexor 118 to accept input pixel data from the second video source 112. This pixel data from the second video source 112 is passed through multiplexor 118 and output on a video out line. If the pixel value input to comparator 116 from the first video source 110 does not match the chromanance key in chroma-key register 114, the output of comparator 116 switches multiplexor 118 to accept input from the first video source 110. In this case, the input pixel data is passed from the first video source 110 through multiplexor 118 and output on the video out line. The prior art system illustrated in FIG. 1 operates to replace any pixels from the first video source 110 that match the chroma-key value with the corresponding pixel value from the second video source 112. This prior art system provides a means for combining two images based on a particular chromanance key value. This prior art system, however, requires that a dedicated color value be predefined and exclusively used for triggering the selection of pixel data from the alternate video source. It is not always convenient or possible to completely control the use of a particular predefined color.

Figure 2A:
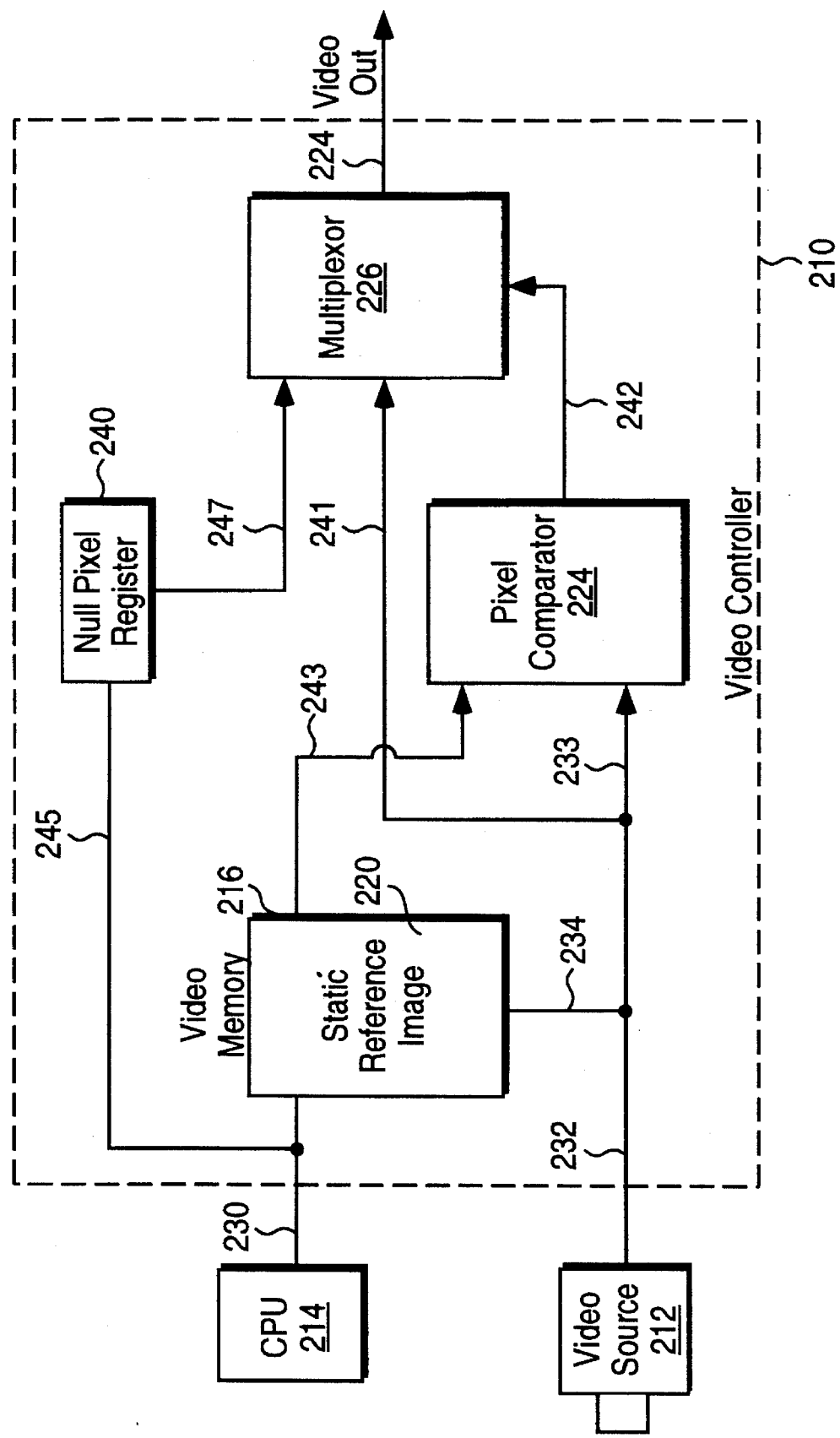
FIG. 2A illustrates the system architecture of the video controller of the preferred embodiment.

Referring now to FIG. 2A, a block diagram of the architecture of the preferred embodiment of the present invention is illustrated. The video controller 210 of the present invention is coupled to a video source 212, which may be a video camera, a video tape recorder, a video cable source, or other conventional source for a video stream. Such a conventional video stream comprises a series of video frames each comprising a set of picture elements or pixels provided as output from video source 212 on line 232 at a predetermined frame rate. Such video sources are well known to those of ordinary skill in the art.

Video controller 210 is also coupled to a CPU 214 on interface lines 230. CPU 214 represents any of a variety of conventional processors such as the Pentlure brand microprocessor manufactured by Intel Corporation, of Santa Clara, Calif. The Pentium and Intel marks are trademarks of Intel Corporation. Under control of CPU 214, video controller 210 receives video input from video source 212, processes this video input in a manner described below, and outputs the resulting video stream on video out line 244.

Video controller 210 includes video memory 216. Video memory 216 is implemented in the preferred embodiment as a conventional video RAM (VRAM) device. Unlike the prior art, however video memory 216 contains a static reference image 220. Static reference image 220 represents a background portion of a video image that does not change from one video frame to the next. Static reference image 220 is initially captured into video memory 216 from video source 212 on lines 232 and 234 under control of CPU 214. After being so captured, the static reference image 220 remains unmodified in video memory 216 during normal operation of the system illustrated in FIG. 2A. The static reference image 220 is used for comparison with foreground video frames received from video source 212 during normal operation of the system. An example of a foreground image video frame 410 is illustrated in FIG. 4.

Figure 4:
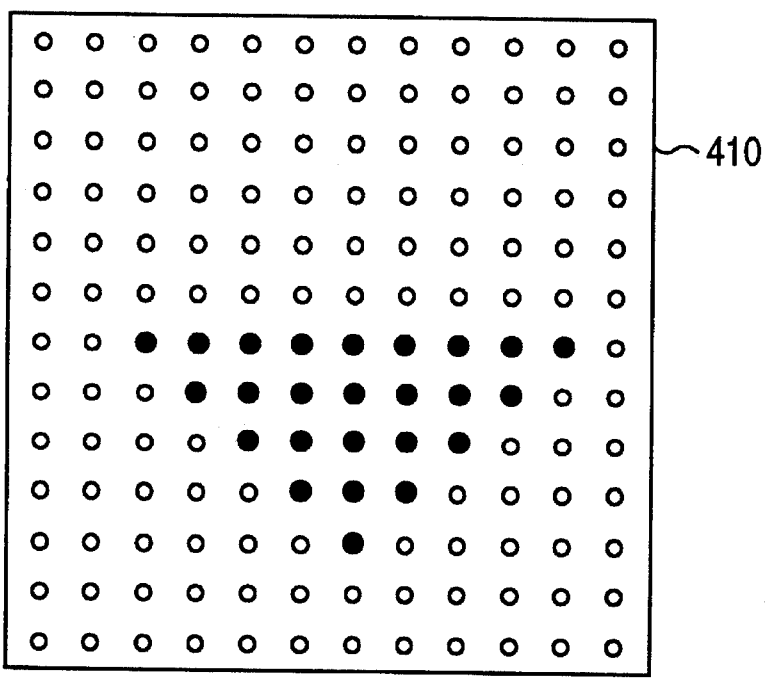
FIGS. 4–6 illustrate examples of the image processing performed by the present invention.

Referring now to FIG. 4, a sample video frame 410 is illustrated. Video frame 410 comprises a plurality of individual pixels that in combination define the foreground image. In the example of FIG. 4, some of the pixels of video frame 410 are actively displayed to represent a downward triangular shape as a sample foreground image. This image is represented in the video stream received on line 232 as a digital representation of each pixel of video frame 410. As well known in the conventional art, individual pixels may be represented as a predefined number of binary bits of information that define a particular color, shade of gray, or display state. Many methods exist in the prior art for encoding image information or pixel data in a digital memory. These conventional encoding techniques include YUV encoding, IRV encoding, or RGB encoding. Each of these conventional image encoding techniques as well as other techniques provide a means for representing the various states of a particular pixel in a predefined number of binary bits. It is typically the case, however that the number of available pixel states is less than the number of values that can be represented by the number of bits assigned to each individual pixel. Thus, unused pixel data values are typically available in most image encoding techniques. For example, in a YUV encoding implementation, the Y component of each pixel is typically represented as an eight bit value. However, in many conventional implementations, the full range of luminance values or display states for the Y component of a particular pixel is defined as a binary value from 16 through 240. Thus, binary values from 0 through 15 and 241 through 255 are unused in the Y component representation using an eight bit field. In the preferred embodiment, these unused portions of the data representation for a particular pixel are used to define a particular pixel as being a null pixel. As will be described below, a null pixel as specified using a predetermined coding value is distinguished from non-null pixels; because, null pixels of a video frame can be processed more efficiently by a video compression algorithm and more expediently transferred across a network as part of a video image. In this manner, the present invention optimizes the manipulation and communication of video images.

Referring again to FIG. 4, the video frame 410 is illustrated prior to being manipulated by the present invention. In the sample foreground image of FIG. 4, each pixel in video frame 410 is encoded as a digital value within a standard value range corresponding to any well known video image encoding technique. Some pixels in the example of FIG. 4 as represented by filled-in dots or circles will be visible on a display screen as a color or monochrome dot. Other pixels, represented as open circles in the sample image of FIG. 4, will be invisible on a display screen. These invisible pixels, however, are still represented as digital values within the range of the conventional encoding technique; therefore, these invisible pixels as present in prior art systems are different from the null pixels as used in the present invention.

Referring again to FIG. 2A, video controller 210 includes a static reference image 220 in video memory 216. Static reference image 220 comprises one or more static video frames used to define a fixed background image which is compared with the dynamic foreground image received from video source 212 on line 232 to produce a modified image in a manner described below.

Figure 5:
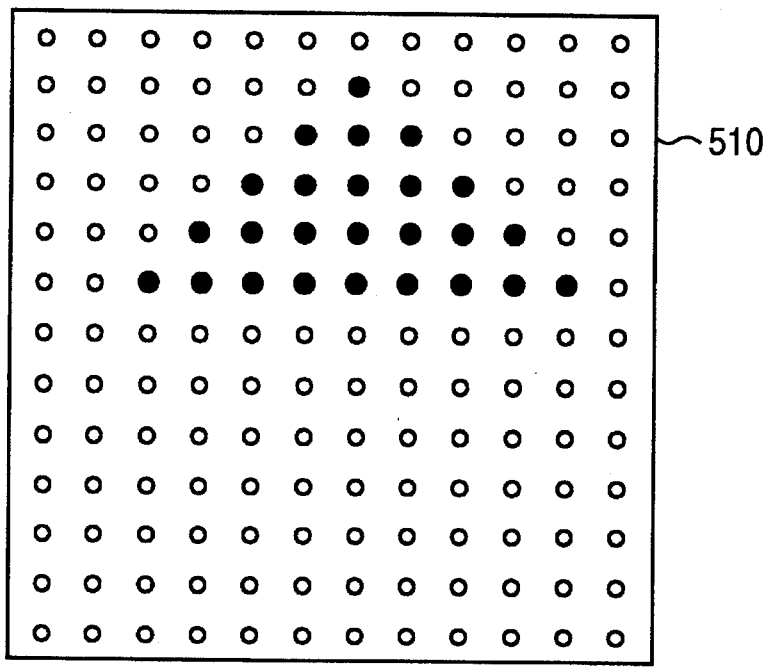

Referring to FIG. 5, a sample reference image video frame 510 is illustrated. In a format similar to the foreground image 410 illustrated in FIG. 4, reference image video frame 510 includes a plurality of pixels that define a reference image. These pixels are encoded into a digital representation in the same manner as the video encoding technique used for foreground video frame 410 illustrated in FIG. 4 and described above. In many video applications, especially desktop video teleconferencing applications, the background image is not changing from one video frame to the next. Because it would be expensive (i.e., would consume many processor cycles) to compress, decompress, and transfer each pixel of the static portion of each video frame, the present invention provides a means for storing one or more static reference images that may be used as background images thereby optimizing the compression, decompression, and transfer of images across a network for each video frame.

Upon initialization of the system illustrated in FIG. 2A, CPU 214 controls the capture of one or more static reference images from video source 212 to video memory 216 via lines 232 and 234. CPU 214 may also control the downloading of a set of static reference images to the video memories of remote computer systems on a network such as the network configuration illustrated in FIG. 3. In this manner, each computer system on a network receives and stores a set of static reference images. This static reference downloading process may occur just prior to the initiation of a video teleconferencing session between each of the computer systems on the network. Because these static reference images are only sent across the network once during initialization, these static reference images can be high quality images scaled to the size of the display window of a particular computer system. In a subsequent communication from CPU 214 to other computer systems on the network, CPU 214 selects one of the static reference images for use during a video teleconferencing session. CPU 214 communicates this static reference image selection to other computer systems on the network. In this manner, each of the computer systems on the network subsequently operate on a pre-selected static reference image. It is also possible for a particular video system to capture and use its own selected static reference image.

In a last initialization step, CPU 214 loads null pixel register 240 with a value corresponding to a null pixel. As described above, this null pixel value corresponds to an unused digital value of the particular video encoding technique used by video source 212. Again, CPU 214 may communicate this null pixel value to other computer systems on the network. Upon completion of these initialization steps, normal operation of the computer system may begin.

During normal operation of the system illustrated in FIG. 2A, video source 212 provides a sequence of video frames on line 232. These video frames are provided to pixel comparator 224 on line 233. The output of video source 212 is also provided as an input to multiplexor 226 on line 241. Video memory 216 and static reference image 220 therein is coupled to pixel comparator 224 on line 243. Null pixel register 240 and the null pixel value therein is coupled to a second input of multiplexor 226 on line 247. An output of pixel comparator 224 on line 242 is used to select the input of multiplexor 226 between either the input from null pixel register 240 on line 247 or the input from video source 212 on line 241. The selected input to multiplexor 226 is output from multiplexor 226 on video out line 244.

During normal operation of the system illustrated in FIG. 2A, a video frame comprising a plurality of pixels is input by pixel comparator 224 on line 233. At the same time, corresponding pixels of a static reference image 220 video frame from video memory 216 are input to pixel comparator 224 on line 243. Pixel comparator 224 compares each pixel from video source 212 to pixels in a corresponding position of a static reference image 220 from video memory 216. For matching pixels of video source 212 and static reference image 220, pixel comparator 224 selects multiplexor 226 to accept input from null pixel register 240 on line 247. Thus, for each matching pixel, a null pixel value is output on video out line 244. For unmatched pixels (i.e. unequal), pixel comparator 224 selects multiplexor 226 to accept input from video source 212 on line 241. In this case, multiplexor 226 outputs each pixel of video source 212 that differs from corresponding pixels from the static reference image in video memory 216. The differing pixels of video source 212 are output from multiplexor 226 on line 244. In this manner, a modified video frame is output on video out line 244. This modified video frame comprises the combination of differing foreground image pixels from video source 212 and null pixel values corresponding to pixels that were equal in both the foreground image and the static reference image. An example of this modified video frame is illustrated in FIG. 6.

An alternative embodiment of the present invention includes logic within pixel comparator 224 for matching pixels between the static reference image 220 and pixels of video source 212 without requiring equality between the pixels. For example, pixel values within a predetermined range are matched thereby generating a null pixel value in the modified video frame even though the static reference pixel was not exactly equal to the pixel received from video source 212. This allows pixels to be compared from video frame to video frame without requiring an exact pixel match. Comparing pixels over multiple video frames provides filtering for transitory fluctuations in a pixel value. In this manner, a form of video filtering is employed to counteract the negative effects of frame to frame variations caused by lighting and/or random noise in the video signal.

Figure 6:
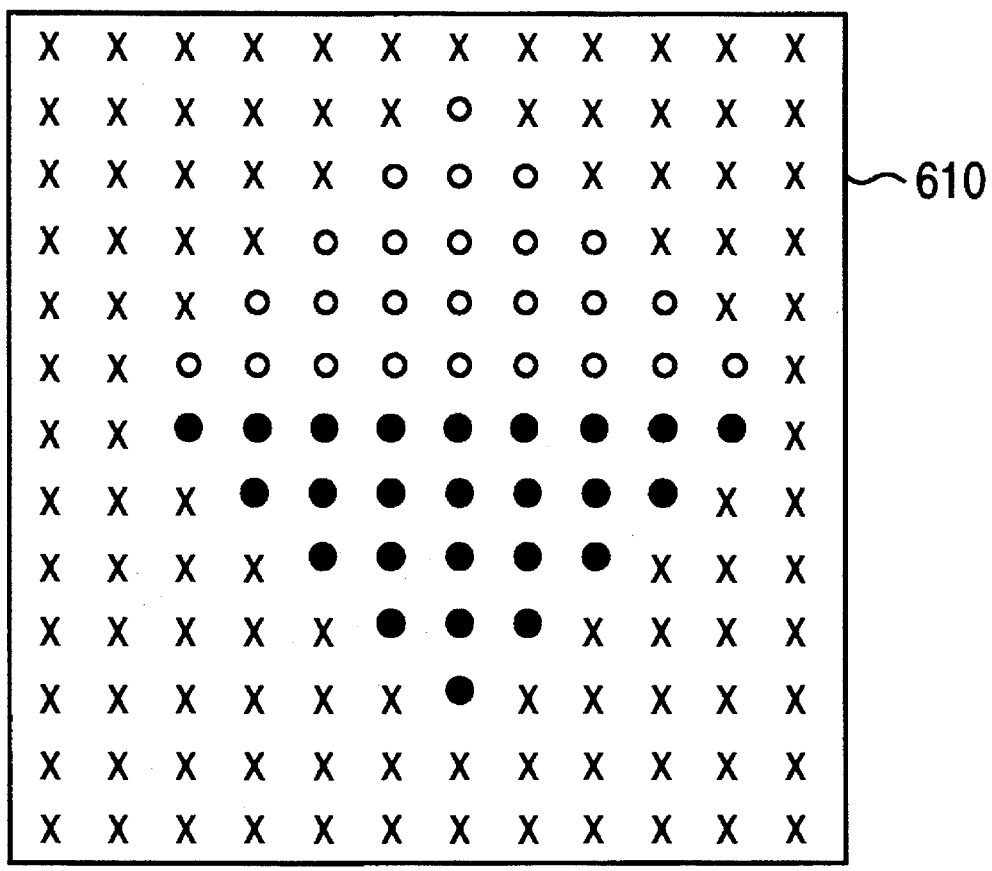

In the sample modified video frame of FIG. 6, the foreground image of FIG. 4 was compared with the reference image of FIG. 5. The resulting modified video frame is represented as the compared image illustrated in FIG. 6. Null pixel values are shown in FIG. 6 by the "x" symbol. Differing foreground image pixels are shown as open or solid (i.e. filled-in) circles. Thus, it can be seen that the foreground image portion of the video frame illustrated in FIG. 6 is distinguishable from the null pixels of the remaining or background portion of the video frame. This modified video frame is output from video controller 210 and sent through a conventional compression/decompression (CODEC) and thereafter to other computer systems on a network. Such a system configuration is illustrated in FIG. 3.

Figure 3:
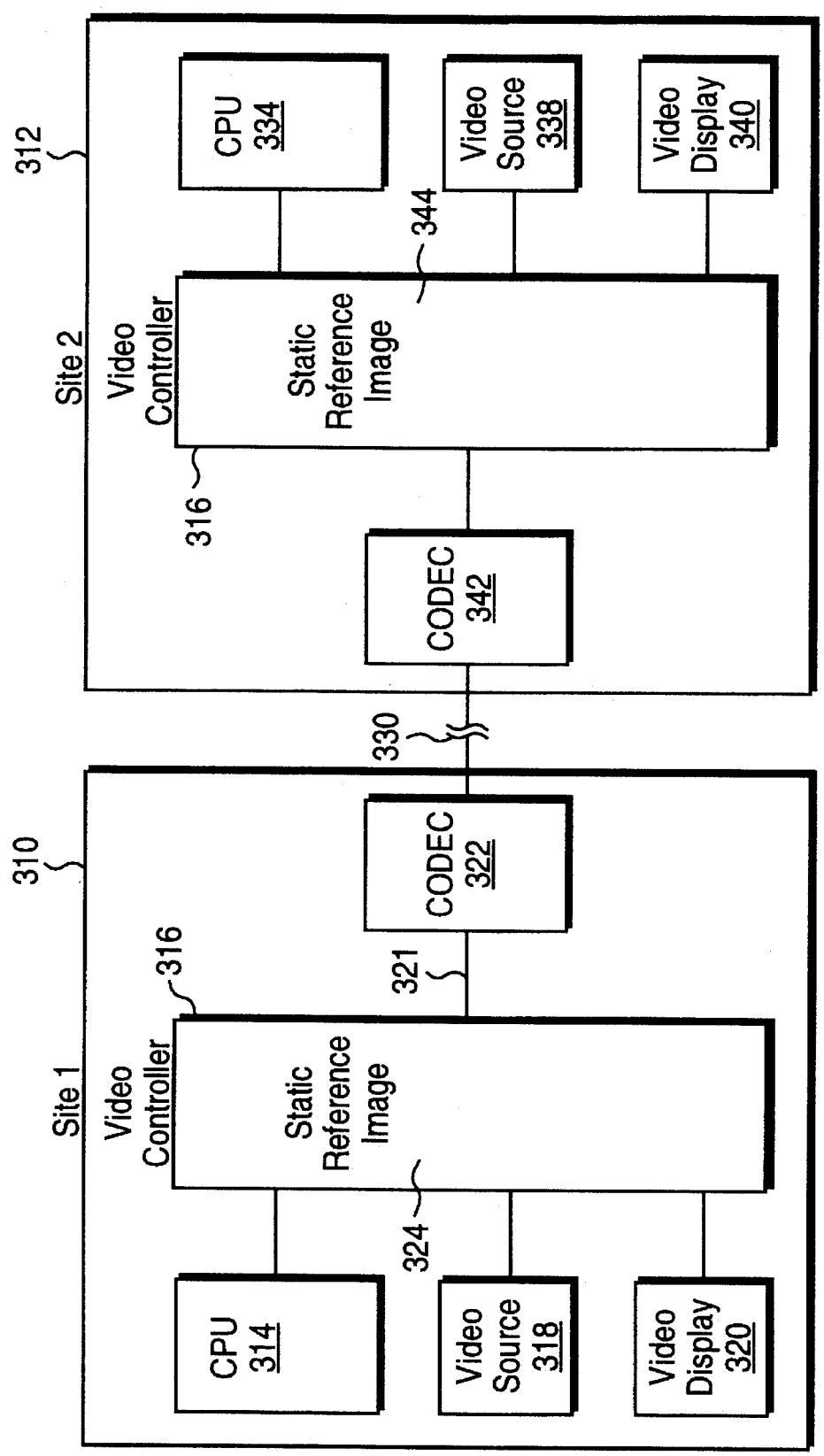
FIG. 3 illustrates the present invention as used in a network environment.

Referring now to FIG. 3, a system configuration is illustrated in which the present invention is particularly useful. A computer system at site 310 is shown coupled to a second computer system at site 312 via network 330. Network 330 may be any of several conventional networks systems including ISDN. Computer system 310 comprises CPU 314, video controller 316, and video source 318. Similarly, computer system 312 comprises CPU 334, video controller 336, and video source 338. In the manner described above, computer system 310 initially controls the capture of one or more static reference image video frames from video display 320. Computer system 310 may download static reference image video frames across network 330 to computer system 312 for storage in static reference image 344 or computer system 312 may provide its own static reference images from a permanent storage medium, such as a disk drive.

During the normal operation of the system as described above, video controller 316 generates a modified video frame which is output to CODEC 322 on line 321. This modified video frame comprises differing foreground pixels and null pixel values for pixels that matched between those received from video source 318 and corresponding pixels of the static reference image in image memory 324. Because CODEC 322 is able to distinguish between the differing foreground pixels and the null pixels, CODEC 322 can very efficiently compress the modified video frame and transfer the video frame on network 330 to a receiving CODEC 342 in computer system 312. On receipt of the compressed modified video frame, CODEC 342 decompresses the video frame and rebuilds the video frame using the static reference image 344. The null pixels are replaced by corresponding pixels from the static reference image 344 by CODEC 342. In this manner, the foreground image video frame such as the video frame 410 illustrated in FIG. 4 is regenerated on computer system 312 from the modified video frame as shown by example in FIG. 6.

Figure 2B:
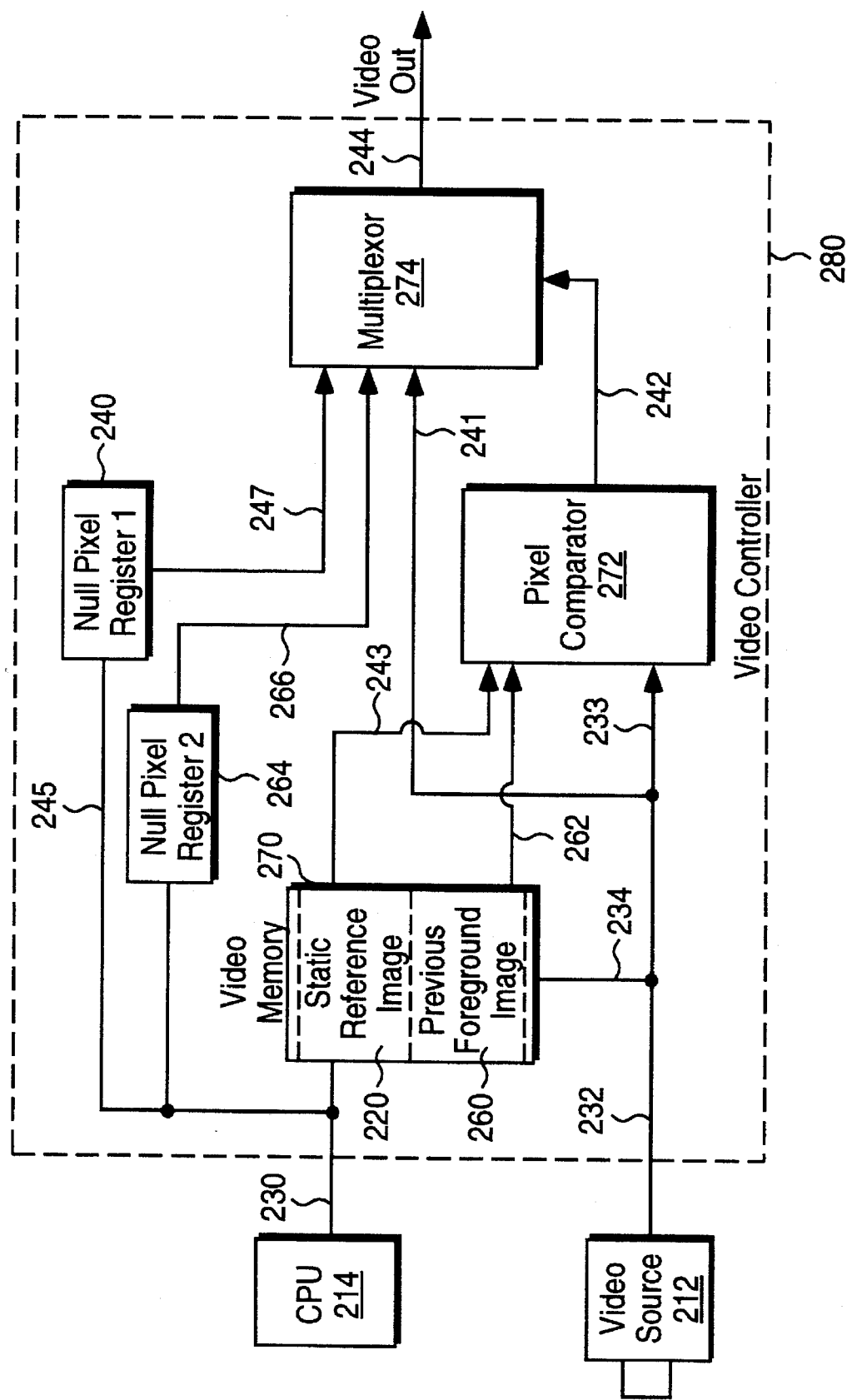
FIG. 2B illustrates the system architecture of the video controller of an alternative embodiment.

Referring now to FIG. 2B, an alternative embodiment of the present invention is illustrated. The video controller 280 is modified in this alternative embodiment to include a previous foreground image 260 in video memory 270. This memory area is used for storage of a previous frame of video pixels received from video source 212. Storage for the static reference image 220 is also provided in video memory 270. Pixel comparator 272 receives input pixels from the static reference image on line 243, input pixels from previous foreground image 260 on line 262, and current foreground image pixels from video source 212 on line 233. A second null pixel register 264 is coupled to CPU 214 and multiplexor 274 on line 266.

During normal operation of the alternative embodiment of FIG. 2B, a static reference image is captured into area 220 in a manner described above. Under control of CPU 214, a foreground video frame from video source 212 is captured into previous foreground image area 260. Null pixel register 240 is loaded with a first null pixel value associated with the static reference image 220. Null pixel register 264 is loaded with a second null pixel value associated with the previous foreground image 260. A current video frame is then received on line 232 from video source 212. This current video image is compared with the static reference image 220 and the first null pixel value from null pixel register 240 replaces matching pixels in the manner described above. In addition, the pixels of the current video image are compared with the corresponding pixels of the previous video image 260. In this case, matching pixels are replaced in the modified video image with the second null pixel value from null pixel register 264. The resulting modified video image thereby contains pixel representations for pixels that differed from the static reference image and the previous video frame. The conventional video compression/decompression algorithm uses this information to more efficiently process and transfer video frames across a network. Once all of the pixels of the current video frame are compared, the current video frame is captured into video memory 270 replacing the previous foreground image 260 in anticipation of the receipt of the next video frame on line 232.

Thus, an apparatus and method for partitioning video images into a first and second portion for more efficient compression/decompression and transfer across a network is disclosed. Although the present invention is described herein with reference to a specific preferred embodiment, many modifications and variations therein will readily occur to those of ordinary skill in the art. Accordingly, all such variations and modifications are included within the intended scope of the present invention as defined by the following claims.

I claim:

1. A video controller comprising:

means for storing a reference image, said reference image including a plurality of reference pixels;

means for receiving a foreground image;

means for comparing said reference image with said foreground image thereby identifying matched pixels without requiring equality of pixels; and means for replacing said matched pixels in said foreground image with null pixels.

2. The video controller as claimed in claim 1 further including means for compressing said foreground image.

3. The video controller as claimed in claim 1 further including means for transferring said foreground image including said null pixels over a network.

4. The video controller as claimed in claim 1 further including means for replacing said null pixels in said foreground image with corresponding pixels from said reference image.

5. The video controller as claimed in claim 1 further including means for transferring said reference image to a different video controller over a network.

6. The video controller as claimed in claim 1 further including:

means for storing a previous foreground image, said previous foreground image including a plurality of previous foreground pixels; and means for comparing said previous foreground image with said foreground image thereby identifying matched pixels.

7. A video system comprising:

a processor;

a video source;

means coupled to said processor and said video source for storing a reference image, said reference image including a plurality of reference pixels;

means for receiving a foreground image;

means for comparing said reference image with said foreground image thereby identifying matched pixels without requiring equality of pixels; and means for replacing said matched pixels in said foreground image with null pixels.

8. The video system as claimed in claim 7 further including means for compressing said foreground image.

9. The video system as claimed in claim 7 further including means for transferring said foreground image including said null pixels over a network.

10. A video controller comprising:

a memory for storing a reference image, said reference image including a plurality of reference pixels;

a video input for receiving a foreground image;

a first pixel comparator for comparing said reference image with said foreground image thereby identifying matched pixels without requiring equality of pixels;

a memory for storing a previous foreground image, said previous foreground image including a plurality of previous foreground pixels;

a second pixel comparator for comparing said previous foreground image with said foreground image thereby identifying matched pixels without requiring equality of pixels; and a multiplexer for replacing said matched pixels in said foreground image with null pixels from said first pixel comparator and said second pixel comparator.

11. The video controller as claimed in claim 10 further including a codec for compressing said foreground image.

12. The video controller as claimed in claim 10 further including means for transferring said foreground image including said null pixels over a network.

13. The video controller as claimed in claim 10 further including means for transferring said reference image to a different video controller over a network.

\* \* \* \* \*

UNITED STATES PATENT AND TRADEMARK OFFICE
CERTIFICATE OF CORRECTION

| | | |
|---|---|---|
| PATENT NO. | : | 5,519,436 |
| DATED | : | May 21, 1996 |
| INVENTOR(S) | : | Bill A. Munson |

It is certified that error appears in the above-identified patent and that said Letters Patent is hereby corrected as shown below:

In column 3 at line 25 delete "Pentlure" and insert --Pentium--

Signed and Sealed this

Fourth Day of February, 1997

Attest:

BRUCE LEHMAN

Attesting Officer

Commissioner of Patents and Trademarks